US007900834B2

(12) United States Patent
Mulcahy

(10) Patent No.: US 7,900,834 B2
(45) Date of Patent: Mar. 8, 2011

(54) ELECTRONIC RECEIPT DELIVERY METHOD

(76) Inventor: David Mulcahy, Palm City, FL (US)

( * ) Notice: Subject to any disclaimer, the term of this patent is extended or adjusted under 35 U.S.C. 154(b) by 1100 days.

(21) Appl. No.: 11/248,515

(22) Filed: Oct. 12, 2005

(65) Prior Publication Data

US 2007/0080204 A1    Apr. 12, 2007

(51) Int. Cl.
*G06F 19/00* (2006.01)
(52) U.S. Cl. ........................................................ 235/385
(58) Field of Classification Search .................. 235/375, 235/385; 705/1
See application file for complete search history.

(56) References Cited

U.S. PATENT DOCUMENTS

| | | | |
|---|---|---|---|
| 6,021,942 A | 2/2000 | Monico | |
| 6,321,992 B1 | 11/2001 | Knowles | |
| 6,394,354 B1 | 5/2002 | Wilz, Sr. | |
| 6,634,551 B2 | 10/2003 | Barta | |
| 6,783,063 B2 | 8/2004 | Holden | |
| 6,827,273 B2 | 12/2004 | Wilz, Sr. | |
| 2003/0149674 A1* | 8/2003 | Good et al. | 705/402 |
| 2004/0084519 A1 | 5/2004 | Barta | |
| 2004/0230439 A1* | 11/2004 | Aptekar | 705/1 |

* cited by examiner

*Primary Examiner* — Daniel A Hess
(74) *Attorney, Agent, or Firm* — Joseph Beckman

(57) ABSTRACT

A method for improving the accuracy and integrity of delivered parcel records and providing the parcel recipient with a record of each delivery, the method including the steps of: delivering a parcel to the intended recipient; obtaining the recipient's signature; electronically linking the recipient's signature to the transaction at the time of delivery; electronically linking an electronic delivery record access slip to the delivery record at the time of delivery; providing the recipient with an electronic delivery record access slip that has a unique transaction number and information sufficient to enable the recipient to retrieve the delivery records from an Internet website, text messaging, e-mail, facsimile, telephone or other device.

13 Claims, 2 Drawing Sheets

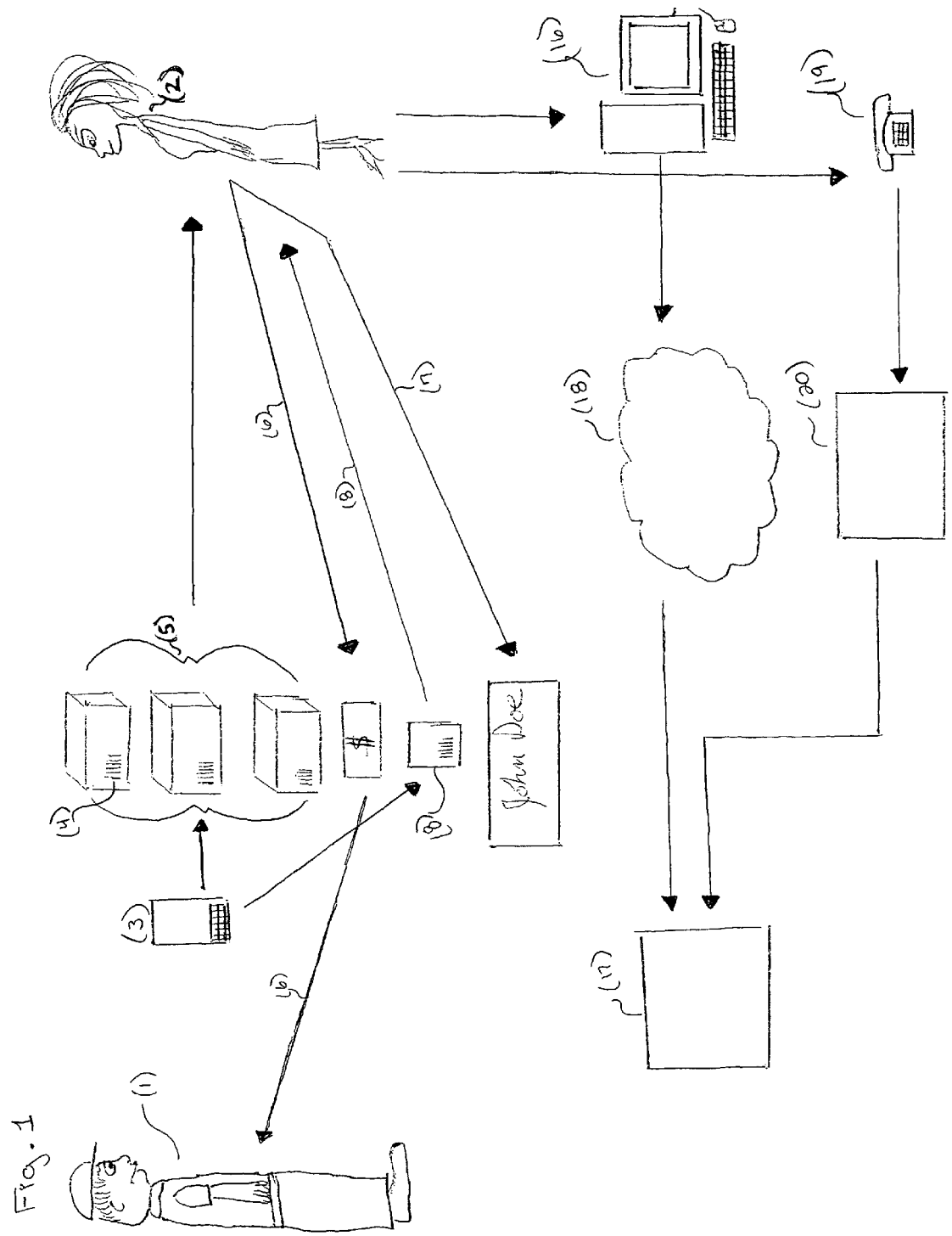

Fig. 2

Electronic Delivery Record Access Slip

9 — Website Access: Go to www.SampleShipper.com/Receipts and enter transaction number.

10 — Email Access: Send email to AutomatedReceipts@SampleShipper.com and put transaction number in the subject line.

11 — Text Messaging: Text transaction number to 1-800-555-5555.

12 — Fax: Fax request and transaction number to 1-800-555-5554.

13 — Phone: Call Customer Service at 1-800-555-5553.

123456789012
Transaction Number

ELECTRONIC RECEIPT DELIVERY METHOD

FIELD OF THE INVENTION

This invention relates to a method for improving the accuracy and integrity of delivered parcel records and providing a record of each delivery to parcel recipients.

BACKGROUND OF THE INVENTION

Various methods and devices used to track the delivery and receipt of parcels are well known in the prior art. Conventionally and ubiquitously, the prior art has developed to improve the tracking of parcels while in transit and/or continuing to track parcels that were undelivered due to failed delivery attempts. The prior art primarily addresses the needs of the senders to track where their parcels are in the delivery process and to verify that their parcels have been delivered. The prior art, however, does not address important post-delivery issues, such as ensuring the accuracy of delivered parcel records and providing parcel recipients with a method to verify and confirm that what they signed for is in fact what they received. The prior art further does not provide a simple way for recipients to access and save multiple delivery records for the recipient's use and benefit.

Traditionally, tracking numbers are only linked to a parcel at the time of mailing. Once a recipient has signed for a parcel, the recipient does not receive a receipt or record reflecting the accepted parcel. Moreover, delivery persons are capable of changing signature records after the recipient has received and signed for the parcels. For example, a recipient may sign for and receive only one parcel but the record can easily be changed, inadvertently or intentionally, to appear as though the recipient received and signed for more than one parcel. As electronic signatures continue to become increasingly accepted in business transactions, clearly there is a need to secure the records to which the signatures are applied.

Moreover, traditional delivery tracking systems require tracking numbers and separate associations for each individual package. Even if a recipient was capable of accessing the prior art delivery records for inventory purposes, the recipient would have to individually input the records since each package requires a separate tracking record. Clearly, there is a need for a delivery system capable of linking multiple parcels to one electronic delivery record access slip, which would enable recipients to view multiple, simultaneous package deliveries in one step for time-saving, improved business tracking of incoming inventory and consolidation of business inventory records.

U.S. Pat. No. 6,634,551 issued to Craig Barta; Matt Miller; Daniel Garcia; Scott Aubuchon, entitled "Delivery Notice And Method Of Using Same," and U.S. application Ser. No. 2004/00845519 entitled "Parcel Delivery Notice" (a continuation of U.S. Pat. No. 6,634,551) both address the issue of continuing to track undelivered parcels due to failed delivery attempts. The recipient receives an attempted delivery notice, which is electronically linked to the undelivered parcels. The recipient uses the unique identifying information on the delivery notice to retrieve parcel information via the Internet or telephone. The Barta patent however does not address the recipient's need for post-delivery verification and confirmation of the accuracy of the delivered parcels records. The Barta patent further does not provide a means for allowing the recipient to download and save accepted delivery records for its use and benefit, such as inventory tracking.

Similarly, U.S. Pat. No. 6,021,942 issued to Dominic L. Monico entitled "Bar-Coded Label for "Attempt to Deliver" Parcels," discloses a business form and method for facilitating delivery of a package. The business form allows the delivery person to scan into the computer database information pertaining to the reasons for non-delivery. The Monico patent does not allow for the recipient to access the information by means other than via the telephone, and the Monico patent further does not address post-delivery verification and confirmation of the accuracy of the delivered parcels records.

Lastly, U.S. Pat. No(s). 6,321,992; 6,394,354; and 6,827,273 issued to Carl Harry Knowles and David M. Wilz, Sr., and respectively entitled: "Internet-based System and Method for Tracking Objects Bearing URL-Encoded Bar Code Symbols," "Internet-based System for Routing, Tracking and Delivering Packages Using URL-Encoded Bar Code Symbols," and "Mobile Driven Information Access Terminal For Remotely Accessing Package Delivery Instructions from an Internet Information Server" involve the use of accessing the Internet to track parcels in transit. However, the patents do not discuss post-delivery functions and are focused toward a system for retrieving delivery instructions.

Clearly there is a need for an electronic receipt delivery system that allows the recipient of a parcel to verify and confirm the accuracy of the delivery records for which the recipient signed and allowing the recipient to save a copy of those delivery records for the recipient's records.

SUMMARY OF THE INVENTION

The present invention provides a method for improving the accuracy and integrity of delivered parcel records and providing the parcel recipient with a record of each delivery, the method including the steps of: delivering a parcel to the intended recipient; obtaining the recipient's signature; electronically linking the recipient's signature to the transaction at the time of delivery; electronically linking an electronic delivery record access slip to the delivery record at the time of delivery; providing the recipient with an electronic delivery record access slip that has delivery company contact information and instructions sufficient to enable the recipient to retrieve the delivery records from an Internet website, text messaging, e-mail, facsimile, telephone or other device.

By accessing the delivery records, the recipient can verify that he or she received all the parcels that his or her signature was applied to at the time of delivery. It is intended that the recipient may verify the number of received parcels, a recipient signature, delivery address, date of delivery, time of delivery, tracking number, shipper name and contact information, package contents and COD payment status. Under the present invention, and absent from the prior art, the recipient can now immediately uncover any inaccuracies in the delivery records and may contact the delivery company and/or sender to notify them of any dispute. This is particularly useful in a world of increasing online commerce as electronic signatures replace paper records and become binding upon the signatory.

Further, it is intended that this invention will allow recipients to easily and conveniently save and store the delivery record information, including multiple, simultaneous parcel deliveries, for their records and other beneficial uses, such as inventory tracking.

BRIEF DESCRIPTION OF THE DRAWINGS

FIG. 1 illustrates a delivery transaction between a delivery person and a parcel recipient.

FIG. 2 illustrates the electronic delivery record access slip.

DESCRIPTION OF THE INVENTION

Shown in FIG. 1 is a delivery transaction between a delivery person (1) and a parcel recipient (2). Using a portable computer or scanner (3), the delivery person (1) scans the barcodes (4) on one or multiple parcels (5) and then hands the parcels to the recipient (2). If a parcel delivery requires cash on delivery (COD), the recipient (2) may submit payment (6) to the delivery person (2) who records the payment (6) in the portable computer (3). The recipient (2) then signs (7) for the delivered parcels (5).

Once the parcels (5) have been delivered and signed for (7), the delivery person (2) scans a pre-printed transaction number from the electronic delivery record access slip (8) to his or her portable computer or scanner (3) and hands the electronic delivery record access slip to the recipient (2) who then may use the electronic delivery record access slip to access and verify the accuracy of the delivery records and also to save the records for such purposes as inventory, if desired.

The electronic delivery record access slip (8), as shown in detail in FIG. (2), informs the recipient of various resources that he or she may access to download and verify the accuracy of the delivery records, including website access (9), email access (10), text messaging access (11), fax access (12), and telephone access (13). The electronic delivery record access slip (8), as shown in detail in FIG. 2, also contains a unique transaction number (14) and barcode (15) that is scanned and electronically linked to the electronic delivery records. The recipient (2) may use the transaction number (14) to access the delivery records through one or all of the access means referenced in FIG. 2, (9) through (15).

Referring back now to FIG. 1, the drawing illustrates two of the delivery access means referenced as (9) and (13). As shown in FIG. 1, the recipient (2) may take the electronic delivery record access slip (8) and by using a computer (16) with Internet (18), access an electronic records database (17) that maintains the delivery records and retrieve the records by entering the unique tracking number (14). Alternatively, the recipient (2) may use a telephone (19) to contact a customer service representative (20) who may then use the transaction number (14) to access the electronic records database (17) and confirm the accuracy of the delivery records on behalf of the recipient (2).

What is claimed is:

1. A method for improving the accuracy and integrity of delivered parcel records, said method comprising the steps of:
    A. Entering identifying parcel information into a delivery company's electronic records;
    B. Delivering at least two parcels originating from at least two senders to an intended recipient;
    C. Obtaining the recipient's signature;
    D. Electronically linking the signature to the delivery company's identifying parcel information at the time of delivery;
    E. Electronically linking an electronic delivery record access slip to the delivery record at the time of delivery;
    F. Providing an electronic delivery record access slip to the recipient, said electronic delivery record access slip being retained by the recipient, and the electronic delivery record access slip containing information sufficient to enable recipient access to identifying parcel information for at least two parcels originating from at least two separate senders in the delivery company's electronic records which information accurately corresponds with information in the company's electronic records, input at the time of delivery.

2. The method of claim 1, wherein in step "E," said electronic delivery record access slip is a pre-printed business form.

3. The method of claim 1, wherein in step "E," said electronic delivery record access slip contains a unique transaction number and bar code.

4. The method of claim 1, wherein in step "E," said electronic delivery record access slip contains instructions for accessing the electronic delivery record and delivery company contact information.

5. The method of claim 1, wherein in step "F," said access is in the form of an internet website, email or other electronic communication.

6. The method of claim 1, wherein the recipient may download and save corresponding identifying parcel information in the delivery company's electronic records.

7. A method for improving the accuracy and integrity of delivered parcel records, said method comprising the steps of:
    A. Entering identifying parcel information onto a computer;
    B. Delivering at least two parcels originating from at least two senders to an intended recipient;
    C. Obtaining the recipient's signature;
    D. Electronically linking the signature to the identifying parcel information at the time of delivery;
    E. Electronically linking an electronic delivery record access slip to the delivery record at the time of delivery;
    F. Providing an electronic delivery record access slip to the recipient, said electronic delivery record access slip being retained by the recipient, the electronic delivery record access slip containing information sufficient to enable recipient access to identifying parcel information for at least two parcels originating from at least two separate senders on a computer which information accurately corresponds with information in the company's electronic records, input at the time of delivery.

8. The method of claim 7, wherein in step "E," said electronic delivery record access slip is a pre-printed business form.

9. The method of claim 7, wherein in step "E," said electronic delivery record access slip contains a unique transaction number and bar code.

10. The method of claim 7, wherein in step "E," said electronic delivery record access slip contains instructions for accessing the electronic delivery record and delivery company contact information.

11. The method of claim 7, wherein in step "F," said access is in the form of an Internet website, email or other electronic communication.

12. The method of claim 7, wherein the recipient may download and save corresponding identifying parcel information in the delivery company's electronic records.

13. A method for improving the accuracy and integrity of delivered parcel records, said method comprising the steps of:
    D. Entering identifying parcel information into a delivery company's electronic records;
    E. Delivering at least two parcels originating from at least two senders to an intended recipient;
    F. Obtaining the recipient's signature;
    G. Electronically linking the signature to the delivery company's identifying parcel information at the time of delivery;

H. Electronically linking an electronic delivery record access slip to the delivery record at the time of delivery, said electronic delivery record access slip containing instructions for accessing the electronic delivery record and delivery company contact information;
I. Providing an electronic delivery record access slip to the recipient, said electronic delivery record access slip being retained by the recipient, and the electronic delivery record access slip containing information sufficient to enable recipient access to identifying parcel information for at least two parcels originating from at least two separate senders in the delivery company's electronic records which information accurately corresponds with information in the company's electronic records, input at the time of delivery.

* * * * *